June 9, 1925.  1,541,168

J. NAMBOTIN

SPEED CHANGING MECHANISM FOR MOTOR VEHICLES OR OTHER APPARATUS

Filed March 5, 1923  2 Sheets-Sheet 1

Inventor:
Joseph Nambotin
By
Attorney.

June 9, 1925. 1,541,168
J. NAMBOTIN
SPEED CHANGING MECHANISM FOR MOTOR VEHICLES OR OTHER APPARATUS
Filed March 5, 1923 2 Sheets-Sheet 2
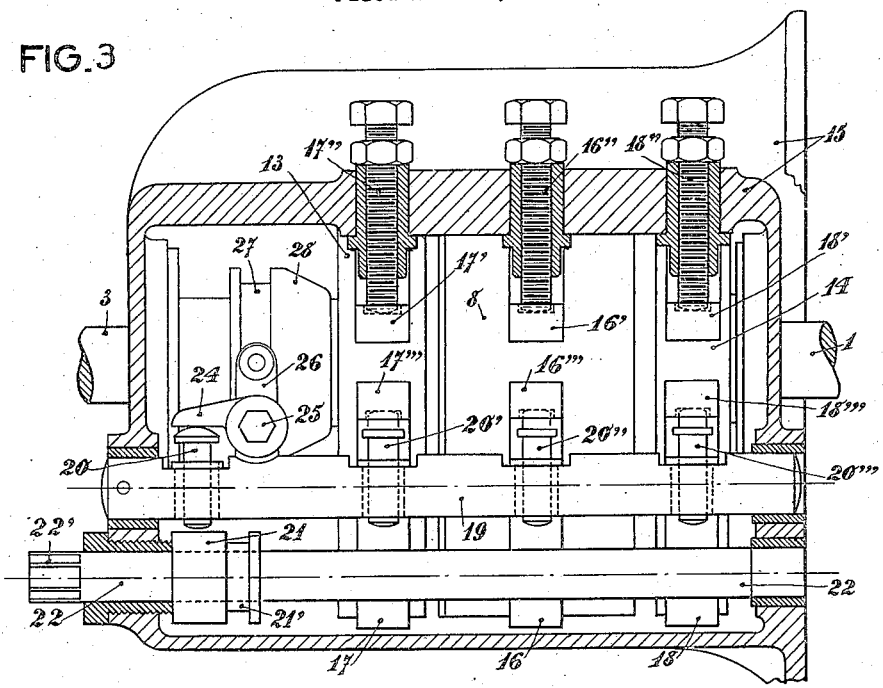
Inventor:
Joseph Nambotin Patented June 9, 1925.

1,541,168

UNITED STATES PATENT OFFICE.

JOSEPH NAMBOTIN, OF LYON, FRANCE, ASSIGNOR TO SOCIÉTÉ ANONYME DES MOTO-CYCLETTES ET AUTOMOBILES VIRATELLE, OF LYON, FRANCE.

SPEED-CHANGING MECHANISM FOR MOTOR VEHICLES OR OTHER APPARATUS.

Application filed March 5, 1923. Serial No. 622,885.

*To all whom it may concern:*

Be it known that I, JOSEPH NAMBOTIN, residing at Lyon, France, a citizen of the French Republic, have invented certain new and useful Improvements in Speed-Changing Mechanism for Motor Vehicles or Other Apparatus, of which the following is a specification.

The present invention relates to speed change gear for motor vehicles or other uses by means of which three speeds in the normal direction of drive (one of them in direct engagement) and a reverse drive can be obtained. The device obviates the jerks inherent to the usual speed change gear. It is characterized by the gears being always in engagement and by each of the speeds comprising a clutch; it follows therefore that the apparatus serves both for speed change box and for coupling.

The device comprises essentially a driving or primary shaft in axial prolongation of which is the driven or secondary shaft, each of these shafts have at their ends facing one another, a pinion, said pinions being of different diameters. These two pinions gear with two pairs of planetary pinions keyed on axles parallel to the axis of the primary and secondary shafts. These two pairs of planet wheel pinions form de-multiplication gearing which can be given a planetary movement round the axes of the primary and secondary shafts.

Accordingly as these two axles and consequently the pinions carried by them are held fixed or left free, the transmission of the movement from the driving shaft to the driven shaft is obtained, either in the same direction and at the same or at reduced speeds, or in the reverse direction at still lower speed, the said transmission operating similarly to mechanism comprising differential gears.

The annexed drawing illustrates the invention.

Fig. 3 is a horizontal section.

Fig. 4 is a cross section through the axis of the fork actuating a grooved sleeve controlling the direct engagement.

Figure 1:
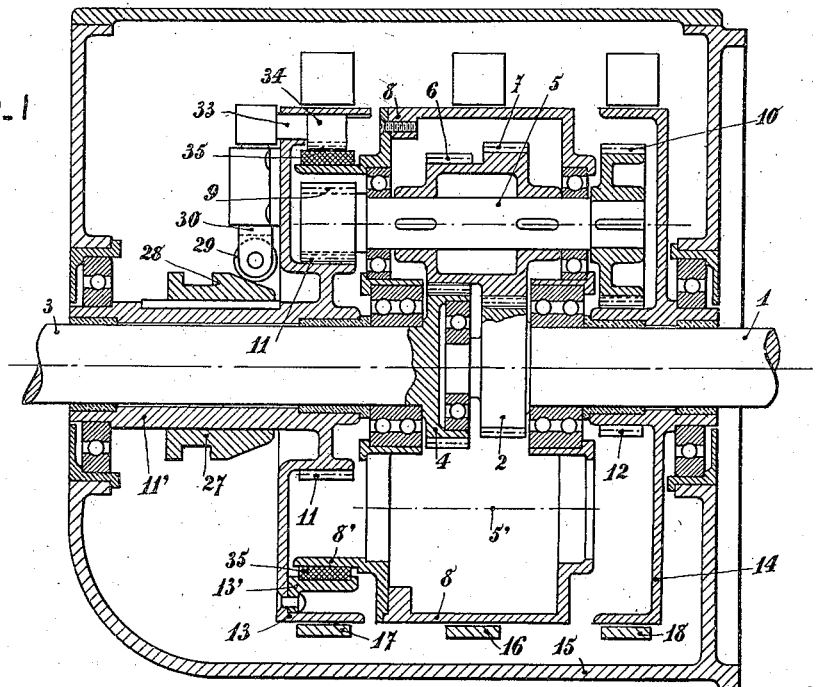
Fig. 1 is an axial vertical section of the gear.

The driving shaft 1 and the driven shaft 3, have, at their ends facing each other, the pinions 2 and 4. The two planet-wheel axles 5, $5^1$ on which are respectively keyed the pinions 6, 7 and $6^1$, $7^1$, pass through the cheeks of the drum 8 into ball bearings; the ends of the said axles which project outside these cheeks carry the respective pinions 9, 10 and $9^1$, $10^1$, which are also keyed thereto. The pinions 9, 10 gear with the pinion 11 integral with the pulley 13 mounted loose on the secondary shaft 3; the pinions $9^1$, $10^1$ gear with the pinion 12 integral with the pulley 14 mounted freely on the primary shaft 1.

The whole as described is contained in a casing 15. All the rotary members are mounted on balls.

The drum-pulley 8 and pulleys 13, 14 are rendered immovable by the tightening of the respective band-brakes 16, 17 and 18 which are mounted and controlled in the same manner, as shown in Figs. 3 and 4. The ends of these bands are strengthened and one end of each is held, at a fixed but adjustable point, by the end of a screw, while the other end is free but may be drawn towards the fixed end so as to press the band strongly round the corresponding pulley. The fixed ends of the brake bands are indicated by $16^1$, $17^1$, $18^1$ and their regulating screws by the reference characters $16^{11}$, $17^{11}$, $18^{11}$. The free ends are indicated by $16^{111}$, $17^{111}$ and $18^{111}$ and are controlled by plungers $20^1$, $20^{11}$, $20^{111}$ sliding in a guide 19 parallel with the axis of the shafts 1 and 3.

These three plungers respectively are pushed against the ends $16^{111}$, $17^{111}$, or $18^{111}$ by means of a cam 21 which is mounted on a shaft 22 of polygonal section arranged parallel with the guide 19 and of which one end is cut as a pinion $22^1$ situated outside the casing 15. This cam can be slid on the shaft 22 by the action of a fork which engages in the groove $21^1$ of the sleeve 21. The fork forms the end of a lever not illustrated; this lever is articulated at a fixed point and is actuated by means of suitable transmission members connected to a regulator handle placed within reach of the driver.

The cam 21 can further control a plunger 20 when the direct engagement is to be effected. The movement of this plunger 20 produces the following action. Opposite the said plunger is a small lever 24 keyed on one of the ends of an axle 25 rotating in bearings $25^1$ and having at its central point a fork 26 engaging in a groove 27 of a conical sleeve 28 sliding over a sleeve $11^1$ surrounding the shaft 3 and integral with the pinion 11 and the pulley 13.

The lever 24 performs, under the action of the plunger 20, a fraction of a revolution which it transmits to the axle 25 and consequently to the fork 26, which then moves from left to right (Figs. 2 and 4) and drives the conical sleeve 28 of which the conical surface produces the lifting of a slide 30 by means of a roller 29 mounted at the lower part of this slide. The upper end of the said slide is articulated at 31 on an arm 32 of which one end is constantly attracted by a spring 36 whilst the other end is mounted by a spindle 33 in the cheek of the pulley 13. This spindle 33 projects inside the said pulley 13 and a toothed sector 34 is mounted thereon the teeth of which gear with the teeth of the outer surface of the free end of a fourth band brake 35 which surrounds the outer circumference of a hoop $8^1$ integral with the drum-pulley 8 and housed inside the pulley 13, Fig. 2. The other end of this band-brake 35 is attached to a felly $13^1$ integral with the pulley 13 and concentric with the latter.

The rotation of the axle 33 therefore produces rotation of the toothed sector 34 which acts on the toothed end of the band brake 35 and draws it towards the fixed end so that it tightly embraces the hoop $8^1$ and renders it stationary.

The purpose of the spring 36 is to compensate the effect of the centrifugal force acting on the arm 32 and to prevent accidental rotation of the sector 34.

The pinion $22^1$ gears with another pinion or a toothed sector actuated by a suitable transmitter connected to a lever or handle within reach of the driver.

Figure 2:
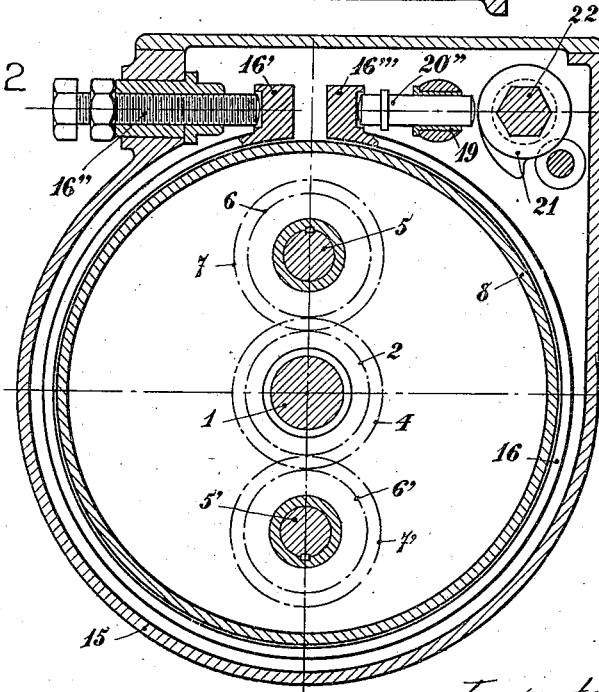
Fig. 2 is a cross section of Fig. 1.

In Fig. 2 neither the axle $5^1$ nor the pinions $6^1$, $7^1$, $9^1$, $10^1$ are illustrated, but these members are similar to the parts 5, 6, 7, 9, 10 and are diametrically opposite the same.

The movements to be effected by the driver in order to effect the alterations of speed are the same for each speed; they consist in operating two levers arranged side by side; one of these levers can assume four different positions respectively effecting the placing of the cam 21 opposite one or other of the four plungers 20, $20^1$, $20^{11}$, $20^{111}$; the other lever controls the rotation of the shaft 22 in order that the said cam 21 may be rotatively driven and push back the plunger opposite which it happens to be.

The different speeds are obtained as follows. Direct engagement or third speed. The cam 21 is brought to the position shown in Fig. 4 in order to push back the plunger 20 and effect the movements previously described to brake the hoop $8^1$ by the band 35 and consequently render immovable the drum-pulley 8. Consequently the pinion 11 acts as key with respect to the pinions 9, $9^1$ and the axles 5, $5^1$ are locked, as well as the pinions 6, 7, $6^1$, $7^1$. The pinions 4 and 2 are consequently also locked and the whole rotates at the speed of the motor shaft 1. Second speed. The cam 21 is brought opposite the plunger $20^{11}$ so as to push it back and tighten the band brake 16 and render immovable the drum pulley 8 and consequently the planet-wheel axles, 5, $5^1$ which can no longer perform a planetary movement but allow pinions 6, 7 and $6^1$, $7^1$ to rotate on their axes at the speed transmitted by the connection of the pinions 2 and 7, $7^1$. The movement is transmitted to the secondary shaft $3^1$ at a speed proportional to the relation of the pinions 6, $6^1$ and 4. In other words, the planetary axles 5, $5^1$ only perform the simple function of reducing gear.

First speed. The cam 21 is brought opposite the plunger $20^1$ so as to effect braking of the pulley 13, the movement transmitted to the secondary shaft 3 is the result of the two following elementary movements:

(a) the movement described with reference to the second speed, that is to say the movement transmitted from the pinion 2 to the pinion 4 by means of the planet-wheel pinions 7, 6 and $7^1$, $6^1$. This movement is in the same direction for pinions 2 and for 4.

(b) a planetary movement in the direction contrary to the former. The relation of the pinions is such that the speed of the planet-wheel movement is lower, in absolute value, than that of the former movement.

Finally the movement transmitted to the secondary shaft is at a lower speed than that obtained in the second speed, but the said movement is in the same direction. Reverse drive. The principle of the reverse drive is the same as for the first speed but the result is not obtained by braking the pulley 13 but the pulley 14. The same two movements (a), (b), described with reference to the first speed are reproduced for the reverse drive, but the relation of the pinions is so selected that the planet-wheel movement prevails over that transmitted from the pinion 2 to the pinion 4 by the epicyclic gear.

The resulting movement is therefore a movement in the contrary direction to that of the driving shaft.

The invention is applicable to all kinds of motor vehicles and can also be used in any type of machine or apparatus where speed change gear is required.

What I claim as my invention and desire to secure by Letters Patent of the United States is:—

Speed change mechanism comprising a casing, a bearing in each of the end walls of said casing, a driving shaft mounted in one of said bearings and extending into said casing, a driven shaft mounted in the other of said bearings and also extending into said casing, a pinion on the end of said driving shaft, a pinion of different diameter than said first mentioned pinion mounted on the end of the driven shaft, said pinions facing one another, two axles arranged diametrical opposite one another on each side of the axis of said shafts and in the same plane therewith, a two cheeked drum freely mounted axially on said shafts and enclosing said pinions, bearings in the cheeks of said drum in which said axles can rotate said axles extending through said cheeks, two planetary wheels of different diameter keyed on each of said axles and within said drum said planetary wheels gearing with said pinions, further planetary wheels keyed on the ends of said axles outside the cheeks of said drum, a pulley mounted loosely on said driving shaft, a toothed wheel integral and co-axial therewith with which two of said further planetary wheels engage, a second pulley loosely mounted on said driven shaft, a toothed wheel integral and co-axial therewith the other two of said further planetary wheels engaging therewith, band brakes round said drum and said pulleys, means for adjusting the effective length of said band brakes, plungers operating to actuate said band brakes, means supporting said plungers, a rotatable shaft of polygonal section mounted in said casing, a cam slidably mounted on said polygonal shaft, means for sliding said cam along said polygonal shaft to actuate one or other of said plungers, a sleeve surrounding said driven shaft, and integral with said first mentioned pulley, a conical sleeve slidable on said first mentioned sleeve, means for sliding said conical sleeve, a sliding member actuated by the sliding movement of said conical sleeve an arm articulated by one end to said sliding member, a spring acting an said arm, a spindle on the other end of said arm said spindle projecting through the cheek of said first mentioned pulley, a toothed sector mounted on said spindle, a hoop integral with one cheek of said drum a band brake surrounding said cheek, one end of said brake being fixed, a block on the free end of said band brake said block having teeth gearing with the teeth of said sector.

In witness whereof I have signed this specification in the presence of two witnesses.

JOSEPH NAMBOTIN.

Witnesses:
 JULIAN KEMBLE SMEDLEY,
 GASTON JEANMIANO.